Patented Nov. 14, 1950

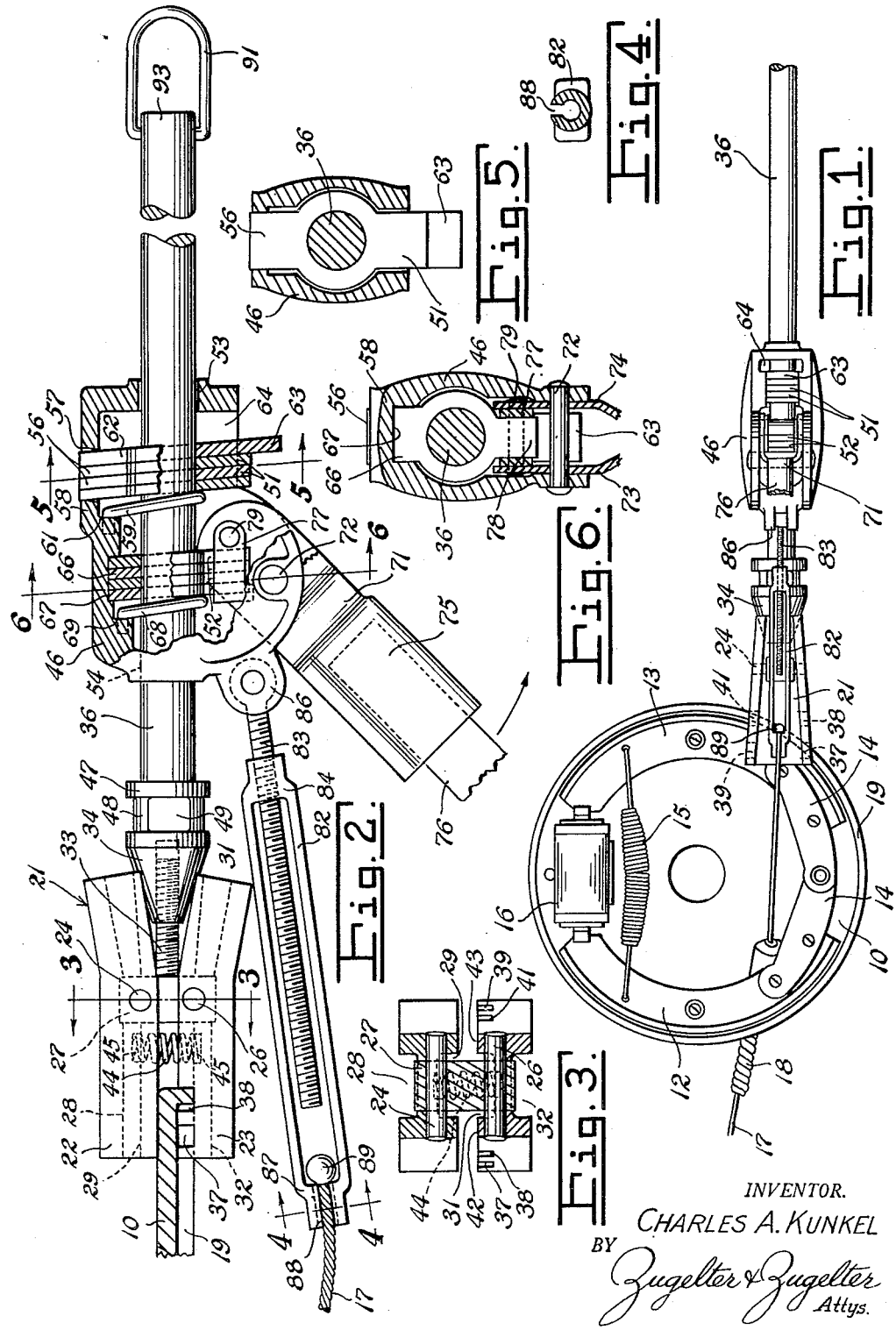

2,529,617

UNITED STATES PATENT OFFICE 2,529,617

CABLE PULLING AND TIGHTENING DEVICE

Charles A. Kunkel, New Richmond, Ohio

Application March 27, 1948, Serial No. 17,427

1 Claim. (Cl. 29—267)

This invention relates to a cable pulling or tightening device and more particularly relates to a device adapted for removing vehicle brake cables from cable housings and for other cable pulling and tightening.

An object of this invention has been to provide a device for pulling or tightening a wire or cable.

An emergency brake cable or other cable of a vehicle may become firmly fixed within a cable housing because of corrosion, rusting, the introduction of foreign matter within the housing, and the like, and it has been a further object of this invention to provide a device capable of exerting a powerful force upon a cable lengthwise of the cable housing for freeing the cable from the housing.

A further object of this invention has been to provide a brake cable puller which can be fastened firmly to a plate of the brake assembly.

The above and other objects may be attained by the means described herein and illustrated in the accompanying drawing, in which:

Figure 1 is a side elevational view showing a cable pulling and tightening device constructed in accordance with this invention, the device being shown attached to a backing or support plate of a vehicle brake.

Figure 2 is a plan view of the device shown in Figure 1, the brake back plate and part of a housing and an operating lever being broken away and in section for clarity of detail.

Figure 3 is a sectional view, the section being taken on line 3—3 in Figure 2.

Figure 4 is a sectional view, the section being taken on line 4—4 in Figure 2.

Figure 5 is a sectional view, the section being taken on line 5—5 in Figure 2.

Figure 6 is a sectional view, the section being taken on line 6—6 in Figure 2.

Briefly, the device includes a clamp of special construction for attaching a pulling means or jack to an edge of a brake back plate, the clamp being attachable in such manner as to place the jack in an advantageous position to exert a pull substantially in line with a cable housing. The device furnishes also a means for attaching an end of the cable to the jack for exerting a pull on the cable, with special consideration given to convenience and efficiency in the use of the device.

Referring now to the drawing, a conventional back plate of a brake is indicated at 10. The brake may include a pair of brake shoes 12 and 13 connected by appropriate links 14. A spring 15 may urge the brake shoes 12 and 13 toward each other and away from a brake drum, not shown, and a wheel cylinder 16 connected with a hydraulic braking system of the vehicle may effect normal hydraulic operation of the brake shoes 12 and 13. An emergency brake cable 17, which passes through a housing 18 may operate the brake shoes 12 and 13 through linkage, not shown, for parking or emergency use. The housing 18 may be attached to the back plate 10 and to the vehicle frame in any appropriate manner.

As indicated in Figure 2, the back plate 10 may have a peripheral lip 19 and a clamp 21 may be firmly fixed to the plate 10 at the lip 19. Details of the structure of the clamp 21 are shown in Figures 2 and 3. The clamp 21 may include two main members 22 and 23 which can rock about pins 24 and 26 respectively. As shown in Figure 3, the pins 24 and 26 may pass through a cross bar 27, the pins being spaced apart parallel to each other and located near the ends of the cross bar 27 so that, as shown, the members 22 and 23 may be spaced apart and can rotate about the pins 24 and 26. Each of the members 22 and 23 may be of I-shaped cross-section, the cross bar 27 extending through cut away portions of the central rib of each I-shaped member. The upper member 22, as shown may include upper and lower lengthwise grooves or channels 28 and 29 while the lower member 23 may include similar upper and lower lengthwise grooves or channels 31 and 32. Formed integrally with the cross bar 27 may be a stud or screw 33 extending between the channels 29 and 31. The stud 33 may be threaded within a cone shaped tip 34 of a rod 36, which rod will be described in greater detail below, and the cone shaped tip 34 may be turned and advanced along the stud 33 to engage the channels 29 and 31 spreading the right hand ends of the members 22 and 23 (Figure 2) to rotate the members about the pins 24 and 26 to bring the left hand ends of the members 22 and 23 toward one another.

As shown in Figure 1, the clamp 21 may be narrow at the end which cooperates with the cone shaped tip 34, expanding toward the other end where it can grip the back plate 10. The lower member 23 may be equipped with transverse slots 37, 38, 39, and 41 across ribs 42 and 43 which form walls of the channel 31 for receiving the lip 19. The slots 37 and 38, as shown, may be in the rib 42 while the slots 39 and 41 may be in the rib 43, the slots 37 and 39 being aligned as are the slots 38 and 41. When the cone shaped tip 34 is advanced along the stud 33, it may force the left hand side of the member 22 downwardly against the plate 10 to cause the lip 19 to be gripped, as shown in Figure 2. If desired, the clamp 21 may be mounted, as shown in Figure 1, with the lip 19 passing through the slots 37 and 41 to mount the clamp 21 and rod 36 in line with the cable 17 and housing 18 and at an angle with a radius of the back plate 10. A spring 44 may be provided between the members 22 and 23, the spring being seated as in seats 45 for holding the members 22 and 23 against the cone shaped tip 34 and for releasing the clamp 21 from the back plate 10 when the cone shaped tip 34 is retracted.

As shown most clearly in Figure 2, the rod 36 is a compression rod and carries a jack housing 46 movable lengthwise of the rod 36, and the housing 46, as shown, may include mechanism of the type generally employed in a bumper jack for a vehicle. Adjacent the cone shaped tip 34, the rod 36 may be equipped with a ring 47 defining, with the tip 34, a gripping section 48 having flats 49 to which a wrench may be applied for turning the rod 36 and tightening the tip 34 against the clamp 21. As shown, the rod 36 may be rotatable within the housing 46 without affecting the mechanism thereof so that the tip 34 can be tightened against the clamp 21 without turning the housing 46.

The mechanism within the housing 46 for moving the housing 46 along the rod 36 may include a series of holding plates 51 and a series of driving plates 52, details of construction of the holding plates 51 being shown in Figure 5 and details of construction of the driving plates 52 being shown in Figure 6.

As shown in Figure 1, the rod 36 may pass through bores 53 and 54 at opposite ends of the housing 46 so that the housing 46 may be slideable along and rotatable about the rod 36. The holding plates 51 may be in the form of a series of plates of hard metal, each of the plates having a central bore fitting about the rod 36. An edge 56 of each plate 51 may fit through a slot 57 in a wall 58 of the housing 46 and the plates 51 can swing about the slot 57 to bind the housing 46 to the rod 36 for preventing movement of the housing 46 toward the clamp 21. A ring 59 of spring material may be provided bearing against the plates 51 and firmly fixed to a shoulder 61 within the housing 46 for urging the plates 51 into position for engagement with the rod 36. A plate 62 may be longer than the other plates 51 and have a finger 63 extending through an opening 64 in a side of the housing 46, and the plates 51 may be releasable from engagement with the rod 36 by movement of the finger 63 toward the clamp 21.

As shown in Figures 2 and 6, the driving plates 52 may be in the form of a series of flat plates of hard metal generally similar to the plates 51. Each of the plates 52 may have a central bore fitting about the rod 36. An end 66 of each plate 52 may fit into and be held in a well 67 in the wall 58, and the plates 52 can swing about the well 67. A ring 68 of spring metal may be provided surrounding the rod 36 and bearing on the plates 52 to hold the plates 52 away from the clamp 21, the ring 68 being fixed to a shoulder 69 within the housing 46.

The plates 52 may be rocked about the well 67 by a driving lever 71, and the driving lever 71 may swing about a pivot pin 72 attached to the housing 46. The lever 71 may have a bifurcated head forming arms 73 and 74 through which the pivot pin 72 can pass. A hollow arm 75 attached to and extending away from the arms 73 and 74 may form a socket for an elongated handle 76 for operating the lever 71, only a portion of the handle 76 being shown. The arms 73 and 74 may be linked to the plates 52 by a clip 77, which may surround extending ends 78 of the plates 52. The clip 77 in turn may be pivoted to the arms 73 and 74 to swing about a pin 79 which passes through the arms 73 and 74. The pin 79 may bear on the extending ends 78 of the plates 52 to drive the plates upon swinging of the lever 71 in the direction indicated by an arrow in Figure 2.

The brake cable 17 may be connected to the housing 46 by means of a turnbuckle sleeve 82 and a long screw 83 threaded in an end 84 of the turnbuckle sleeve 82. The head of the screw 83 may be pivoted, as shown, to a lug 86 or to a pair of such lugs extending from the housing 46. The other end 87 of the turnbuckle sleeve 82 may be slotted, as shown at 88 in Figure 4 to receive the cable 17, and a sphere or head 89 at the end of the cable 17 may rest within the sleeve 82 to anchor the cable.

A suitable coupling member or hanger 91 may be attached to the free end of the rod 36. The member 91 may be of any desired shape or size and may be used to adapt the device for pulling or tightening fence wire, guys, and the like, as will be explained more fully below.

The operation of the cable pulling and tightening device will be understood from the foregoing detailed description and from the drawing.

The clamp 21 may be attached to the brake back plate 10 by turning the rod 36 and cone shaped tip 34 to advance the tip 34 between the members 22 and 23 causing the clamp 21 to grip the lip 19 of the plate 10. As shown in Figure 2, the member 22 can rest against the surface of the back plate 10 while the lip 19 of the back plate is held in slots in the member 23 to hold the back plate 10 firmly between the members 22 and 23 and position the rod 36 to extend outside the back plate 10, the rod 36 and the back plate 10 being held firmly in relative position.

The turnbuckle sleeve 82 can be adjusted to grip the sphere 89 at the end of the cable 17. Then the lever 71 can be swung about the pivot pin 72 to advance the housing 46 along the rod 36, the plates 52 gripping the rod 36 for driving the housing 46, the plates 51 engaging the rod 36 during return strokes of the lever 71 to hold the housing 46 against sliding toward the clamp 21 during the return strokes.

As will be apparent, a powerful pull may be exerted by the device lengthwise of the cable housing 18 for pulling the cable 17 from the housing 18 so that notwithstanding corrosion and rusting of the cable 17 within the housing 18, the cable can be pulled free. Moreover, as shown in Figure 1, the device may be mounted with the rod 36 parallel to the ground and the device may be operated simply by horizontal movement of the handle 76, and the handle 76 can extend outwardly from the vehicle into position for ready operation.

By use of the member 91, the device may be adapted for pulling or tightening wire for a fence or the like. The member 91, for this purpose may be fastened to or fitted over a fence post or stake, and the turnbuckle sleeve 82 may be attached to an end of a fence wire and the wire tightened by advancing the housing 46 along the rod 36, as heretofore explained.

A plate type jack of the type shown has found particular value as a part of the device, but other types of jack structures may be substituted. The cone shaped tip 34 of the rod 36 may, as shown, be integral with the rod 36, or a separate element may be used to rotate the members 22 and 23 to operate the clamp 21. Various other modifications of the structure can be made within the spirit of the invention, and the invention is not intended to be limited by the foregoing detailed description and by the drawing except as set out in the appended claim.

What is claimed is:

A brake cable pulling device which comprises a compression rod, a jack housing mounted on and slidable along the rod, means for locking the jack housing to the rod against movement in one direction, means including a handle for advancing the jack housing along the rod in the opposite direction, means on the jack housing for securing a brake cable thereto, means at the end of the rod from which the jack housing is advanceable for securing the rod to a brake drum comprising a screw threaded in an axial bore in said end of the rod, a transverse bar attached to said screw remote from said rod, a pair of jaw members mounted on said transverse bar, at least one of said jaw members being pivotally mounted on said transverse bar, each of said jaw members having a portion on one side of the transverse bar engageable with said end of the rod and a gripping face disposed on the other side of the transverse bar, said rod being rotatable in said jack housing to drive said end of the rod against the jaw members to urge the gripping faces thereof together.

CHARLES A. KUNKEL.

REFERENCES CITED

The following references are of record in the file of this patent:

UNITED STATES PATENTS

| Number | Name | Date |
|---|---|---|
| 165,536 | Brown et al. | July 13, 1875 |
| 166,553 | Pollard | Aug. 10, 1875 |
| 386,478 | Lourie | July 24, 1888 |
| 451,024 | Chadwick | Apr. 28, 1891 |
| 600,242 | Allen | Mar. 8, 1898 |
| 988,869 | Franklin | Apr. 4, 1911 |
| 1,201,146 | Cerney | Oct. 10, 1916 |
| 2,174,489 | Groves | Sept. 26, 1939 |
| 2,484,400 | Brown | Oct. 11, 1949 |